US012688716B2

(12) United States Patent
Brodsky et al.

(10) Patent No.: US 12,688,716 B2
(45) Date of Patent: Jul. 21, 2026

(54) COMPUTER-BASED TOOLS AND TECHNIQUES FOR VEHICLE DETECTION

(71) Applicant: Fleetmind Seon Solutions Inc, Coquitlam (CA)

(72) Inventors: Tomas Brodsky, Cortlandt Manor, NY (US); Juan Daniel Morales, Medellín (CO); Franklin Martinez, Bogotá (CO); Diego Lamus, Matosinhos (PT)

(73) Assignee: FLEETMIND SEON SOLUTIONS INC., Coquitlam (CA)

( * ) Notice: Subject to any disclaimer, the term of this patent is extended or adjusted under 35 U.S.C. 154(b) by 215 days.

(21) Appl. No.: 18/239,668

(22) Filed: Aug. 29, 2023

(65) Prior Publication Data

US 2024/0071109 A1     Feb. 29, 2024

Related U.S. Application Data

(63) Continuation of application No. PCT/US2023/073025, filed on Aug. 28, 2023.

(Continued)

(51) Int. Cl.
*G06V 20/62* (2022.01)
*G06T 7/11* (2017.01)
(Continued)

(52) U.S. Cl.
CPC .............. *G06V 20/625* (2022.01); *G06T 7/11* (2017.01); *G06T 7/246* (2017.01); *G06T 7/74* (2017.01);
(Continued)

(58) Field of Classification Search
CPC ...... G06V 20/625; G06V 10/26; G06V 20/58; G06V 20/588; G06V 2201/08;
(Continued)

(56) References Cited

U.S. PATENT DOCUMENTS 9,928,735 B2 *   3/2018   Wang ............... G08G 1/096775
11,003,919 B1    5/2021   Vaibhav et al.
(Continued)

FOREIGN PATENT DOCUMENTS

WO    2022082130 A1    4/2022
WO    2022099237 A1    5/2022
WO    2022165459 A1    5/2022

OTHER PUBLICATIONS

International Search Report and Written Opinion dated Jan. 30, 2024 for corresponding International Application No. PCT/US2023/73025; International Filing Date: Aug. 28, 2023 consisting of 35-pages.

*Primary Examiner* — Bobbak Safaipour

(74) *Attorney, Agent, or Firm* — Meunier Carlin & Curfman LLC

(57) ABSTRACT

A vehicle analysis system provides an automatic license plate recognition module that receives image data from an ALPR camera detecting a license plate of a target vehicle. A context camera module of the system receives image data from a context camera capturing image data of the target vehicle. A geographical data module of the system can access map image data including a plurality of map definitions associated with a plurality of restricted zones. An artificial intelligence model and/or algorithm combines portions of each of the ALPR image data, the context camera image data, and the map image data, and uses the combined data for determining a location of the target vehicle in relation to at least one restricted zone.

22 Claims, 23 Drawing Sheets

Related U.S. Application Data

(60) Provisional application No. 63/401,695, filed on Aug. 28, 2022.

(51) Int. Cl.

| | |
|---|---|
| *G06T 7/246* | (2017.01) |
| *G06T 7/73* | (2017.01) |
| *G06T 7/80* | (2017.01) |
| *G06V 10/26* | (2022.01) |
| *G06V 20/56* | (2022.01) |
| *G06V 20/58* | (2022.01) |

(52) U.S. Cl.

CPC ............... *G06T 7/80* (2017.01); *G06V 10/26* (2022.01); *G06V 20/58* (2022.01); *G06V 20/588* (2022.01); *G06T 2207/20084* (2013.01); *G06T 2207/30256* (2013.01); *G06V 2201/08* (2022.01)

(58) Field of Classification Search

CPC ...... G06V 10/82; G06V 20/56; G06V 20/582; G06V 20/63; G06T 7/11; G06T 7/246; G06T 7/74; G06T 7/80; G06T 2207/20084; G06T 2207/30256

See application file for complete search history.

(56) References Cited

U.S. PATENT DOCUMENTS

| | | | |
|---|---|---|---|
| 11,164,014 B1 | 11/2021 | Vaibhav et al. | |
| 11,322,017 B1 | 5/2022 | Ghadiok et al. | |
| 11,651,601 B1 * | 5/2023 | Young | G06V 20/54 |
| | | | 348/149 |
| 2007/0035632 A1 * | 2/2007 | Silvernail | H04N 5/28 |
| | | | 348/211.3 |
| 2013/0028481 A1 * | 1/2013 | Wu | G06T 5/80 |
| | | | 382/105 |
| 2016/0341558 A1 | 11/2016 | Lee | |
| 2016/0341566 A1 * | 11/2016 | Fund | G08G 1/0141 |
| 2018/0137356 A1 * | 5/2018 | Nerayoff | H04N 23/66 |
| 2020/0327343 A1 | 10/2020 | Lund et al. | |
| 2021/0097300 A1 * | 4/2021 | Schmer | G06F 18/254 |
| 2021/0124966 A1 * | 4/2021 | Blais-Morin | G06V 10/751 |
| 2021/0295080 A1 | 9/2021 | Chen et al. | |
| 2022/0042821 A1 | 2/2022 | Patterson et al. | |
| 2022/0067394 A1 * | 3/2022 | Suksi | G08G 1/0175 |
| 2022/0121860 A1 | 4/2022 | Vaibhav et al. | |
| 2022/0147745 A1 | 5/2022 | Vaibhav et al. | |
| 2022/0198262 A1 * | 6/2022 | Keserich | G01C 21/3815 |
| 2023/0283753 A1 | 9/2023 | Vaibhav et al. | |
| 2023/0290245 A9 | 9/2023 | Vaibhav et al. | |
| 2023/0326220 A1 | 10/2023 | Vaibhav et al. | |
| 2024/0304002 A1 | 9/2024 | Vaibhav et al. | |
| 2025/0069495 A1 | 2/2025 | Vaibhav et al. | |
| 2025/0201446 A1 * | 6/2025 | Morales Huerta | C09D 7/61 |

* cited by examiner

202

402

502

202

702

802

902

1004 inside:   0.00%

1202

1302

1502

1602

COMPUTER-BASED TOOLS AND TECHNIQUES FOR VEHICLE DETECTION

CROSS-REFERENCE TO RELATED APPLICATION/PRIORITY CLAIM

The present application is a continuation of International Patent Application No. PCT/US23/73025, filed Aug. 28, 2023, which claims priority to U.S. Provisional Patent Application Ser. No. 63/401,695, filed on Aug. 28, 2022, the entirety of which is incorporated by reference herein.

FIELD OF THE INVENTION

In various embodiments, the present invention generally relates to computer-based tools, devices, and processes for determining vehicle violations, including identifying vehicles illegally parked in bus lanes, bus stops, bicycle lanes, parking areas, and other restricted zones, for example. Among other things, these tools and techniques can combine data derived from cameras, video, GPS devices, and/or inertial sensors, and then apply computer vision and other advanced algorithms to determine and enforce vehicle violations.

BACKGROUND

Efficient operations of transit system operations is a priority for any transit agency. With a goal to improve the movement and safety of passengers, employees and agency infrastructure, transit agencies have embraced new, proactive measures and leading-edge technologies. In recent years, they have added video surveillance cameras, rear vision systems, live video streaming, and GPS tracking to help them meet both performance goals and safety initiatives.

Cities, towns, and other population centers in the United States continue to grow. The United States population grew by 16.4 million from 2010 to 2017, and the number of cars on its streets has grown by 27.4 million between the years of 2012 and 2018. This has resulted in increased challenges for transit agencies in terms of meeting operational and efficiency goals. Municipalities and agencies have access to cost-effective technology to help them thrive among all this change. Yet, with regard to safety and efficient operational goals, transit agencies still need to do more.

Municipalities and transit agencies have been trying to tackle this critical issue as an industry for years. To improve transit bus movement, municipalities in conjunction with transit agencies have introduced solutions such as dedicated bus lanes and other measures to maximize the ability of fleets to meet operational efficiency goals and other standards whenever possible. It needs to be acknowledged that any tool, technology, or planning measure has limitations even when operating under ideal circumstances.

Transit agencies and their goals of improving operational efficiencies are challenged by many outside influences. Dedicated bus lanes provide a solution that may partially help to address these goals, but the effect of actual traffic conditions often frustrate or complicate achieving the goals. For example, issues can arise with distracted drivers, drivers who purposefully ignore lane restrictions, delivery vehicles, emergency vehicles (e.g., police, ambulance, and fire vehicles), and other complicating factors which infringe on dedicated transit corridors. Many of these traffic conditions serve alone or in combination to act as an impediment to achieving the efficiency goals of the transit agency.

SUMMARY

A vehicle enforcement system includes a vehicle analysis system. The vehicle analysis system comprises: an automatic license plate recognition module programmed for receiving image data from at least one ALPR camera in association with a license plate of a target vehicle; a context camera module programmed for receiving image data from at least one context camera in association with the target vehicle; a geographical data module programmed for accessing map image data from at least one geographical data storage which stores a plurality of map definitions associated with a plurality of restricted zones; and at least one artificial intelligence model and/or algorithm programmed for: combining at least a portion of each of the received ALPR image data, the received context camera image data, and the geographical data storage map image data, and using at least portion of the combined data for determining a location of the target vehicle in relation to at least one restricted zone.

BRIEF DESCRIPTION OF THE FIGURES

FIG. 21 illustrates an example of filtering output from the ALPR engine.

DETAILED DESCRIPTION

The inventors appreciate that solutions which solve the efficiency and safety challenges described above should address these challenges without causing significant collateral issues. For example, these solutions should not impede the critical role of first responders and the legitimate needs of those providing services and goods that support the needs of the community. Solutions are needed which can effectively balance legitimate needs against providing useful tools and techniques by which illegal vehicle impediments can be addressed in an efficient and transparent way while minimizing the need for additional human capital and resources.

Figure 1:
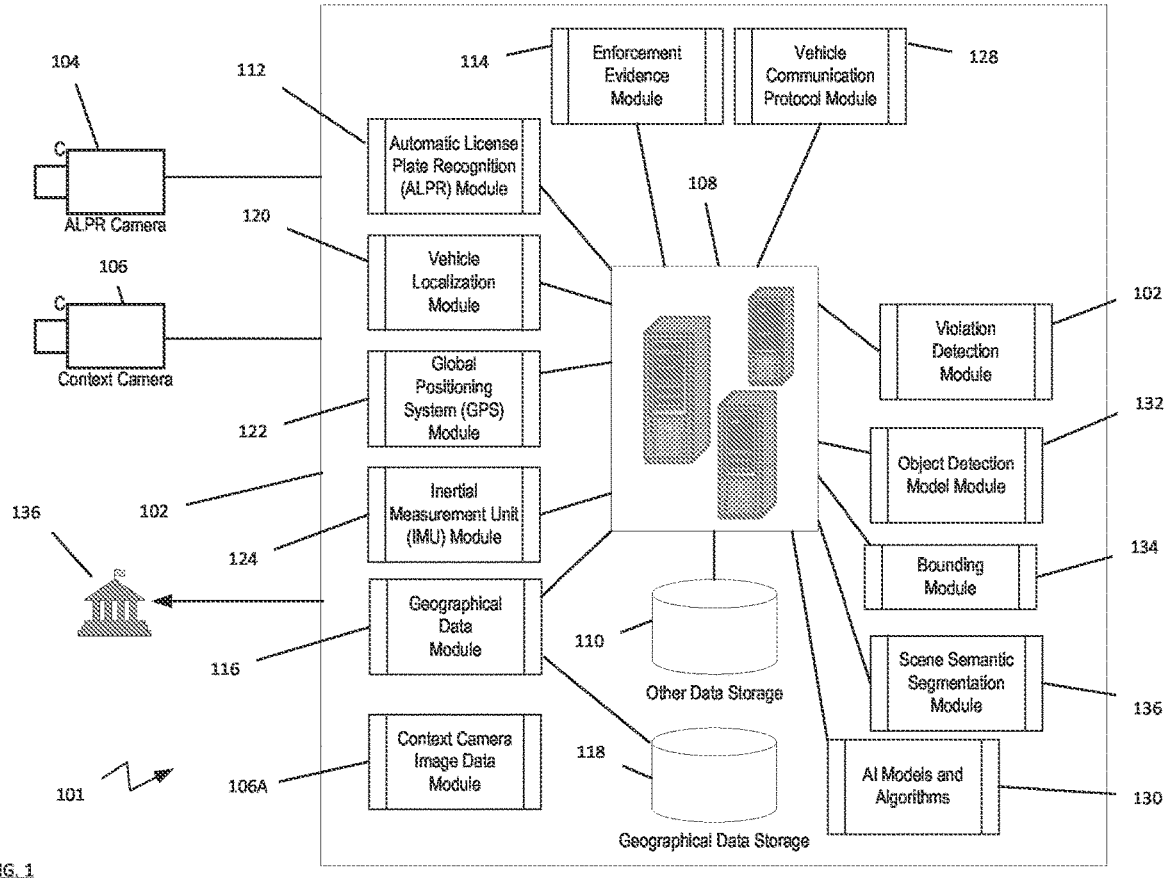
FIG. 1 schematically illustrates one example of a vehicle enforcement system including a vehicle analysis system.
Figure 2:
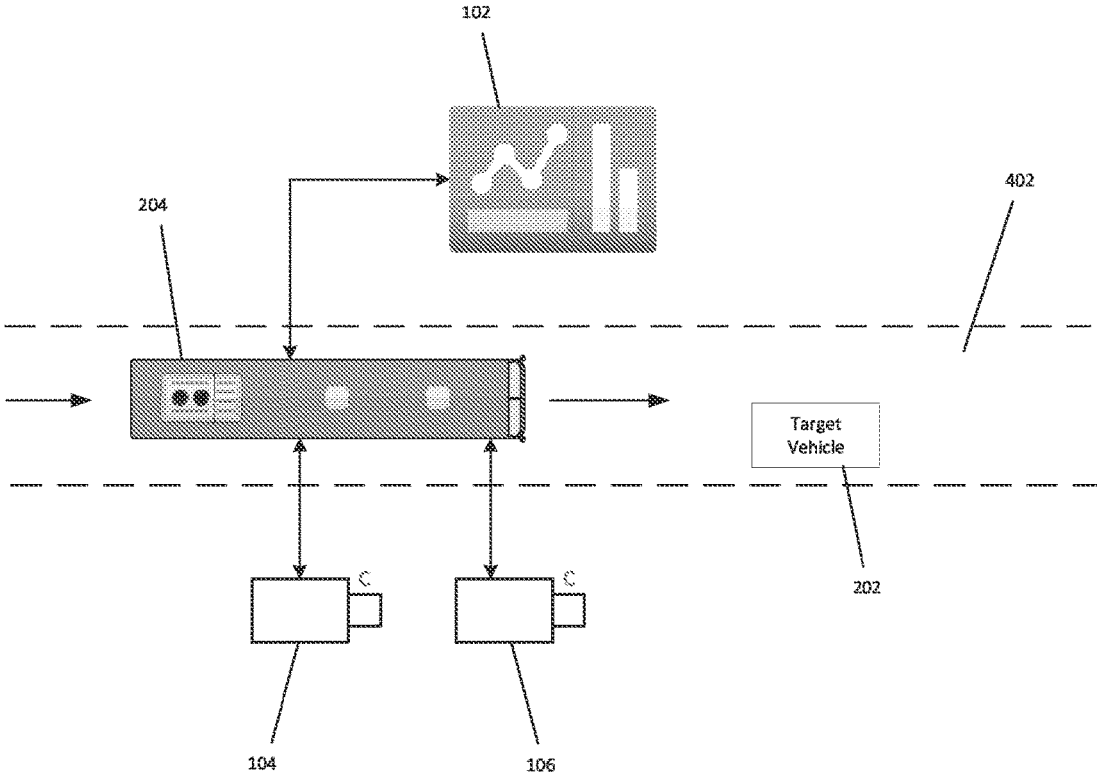
FIG. 2 illustrates the vehicle enforcement system of FIG. 1 as implemented in operative association with a system vehicle to detect target vehicle.
Figure 3:
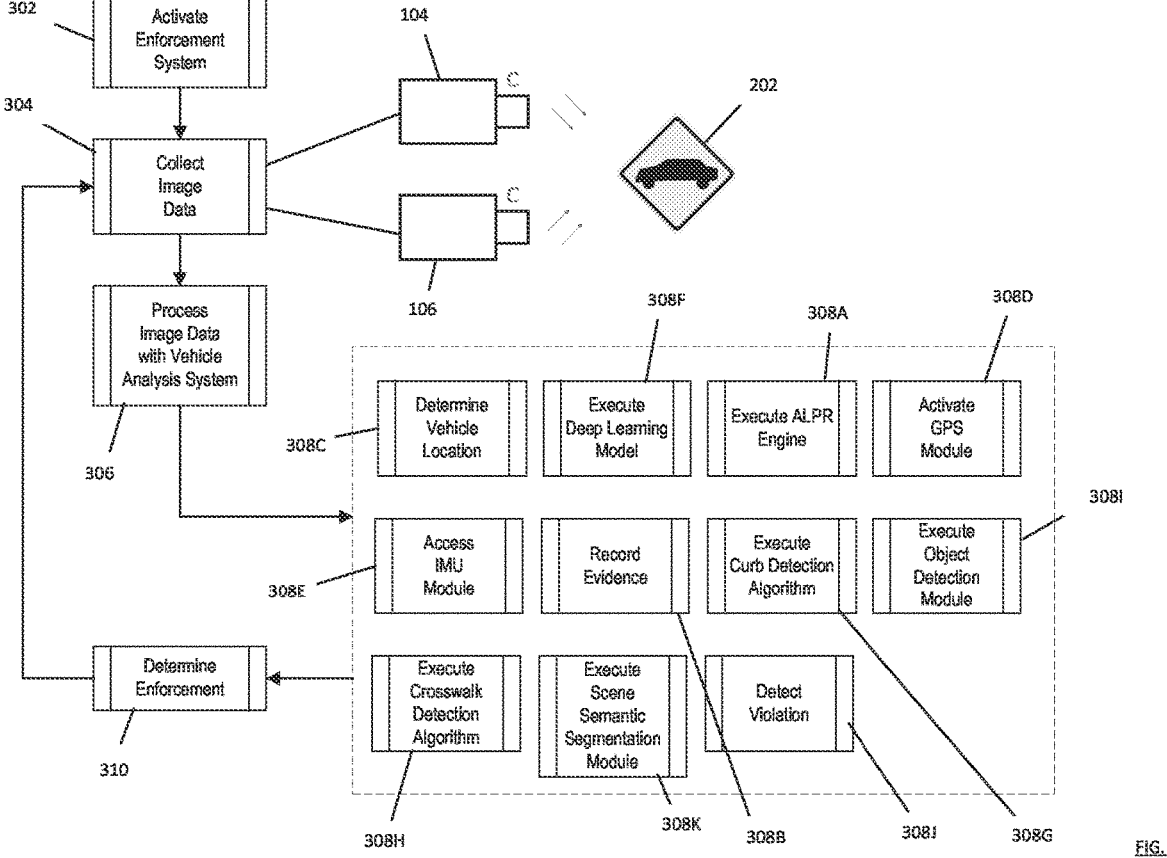
FIG. 3 includes a process flow diagram illustrating examples of various tasks, functions, and processes performed by the vehicle analysis system of FIG. 1.

With reference to FIGS. 1 through 3, one example of a vehicle enforcement system 101 is schematically illustrated. The system 101 can be programmed to analyze and determine the identity, position, and/or location of different types of target vehicles 202 relative to restricted zones such as bus lanes, bus stops, bicycle lanes, and/or parking areas (at times when no parking is permitted). In various embodiments, certain components of the system 101 can be installed on a system vehicle 204, such as a transit vehicle (e.g., a bus) traveling via a bus lane 206 in a city, for example. In various embodiments of the invention described herein, upon activation of the enforcement system 101 at step 302, a vehicle analysis system 102 can be programmed to receive and process image data captured by one or more cameras 104, 106, including an automatic license plate recognition (ALPR) camera 104 and a context camera 106, for example. The LPR camera may be a 1080p or 4K camera, for example, configured to capture license plate images. The camera settings can be dynamically controlled by the system to adapt to different lighting conditions and to different scenarios during both day and night.

At step 306, the analysis system 102 can process and analyze the image data to potentially identify target vehicles 202 illegally parked, for example, in bus lanes, bus stops, bicycle lanes, and other restricted zones. In various embodiments, the analysis system 102 can combine data derived from video, GPS, and inertial sensor sources, and it can execute computer vision and other advanced algorithms to determine confirmed violations that can then be submitted to a ticketing system 136, for example. The system 102 may be configured with one or more computer-implemented processors (e.g., computer servers 108) to execute various tasks and functions within the system 102. One or more data storage media 110 may be operatively associated with the processors 108 for storing, retrieving, and permitting access to various types of data used by the system 102.

Figure 4:
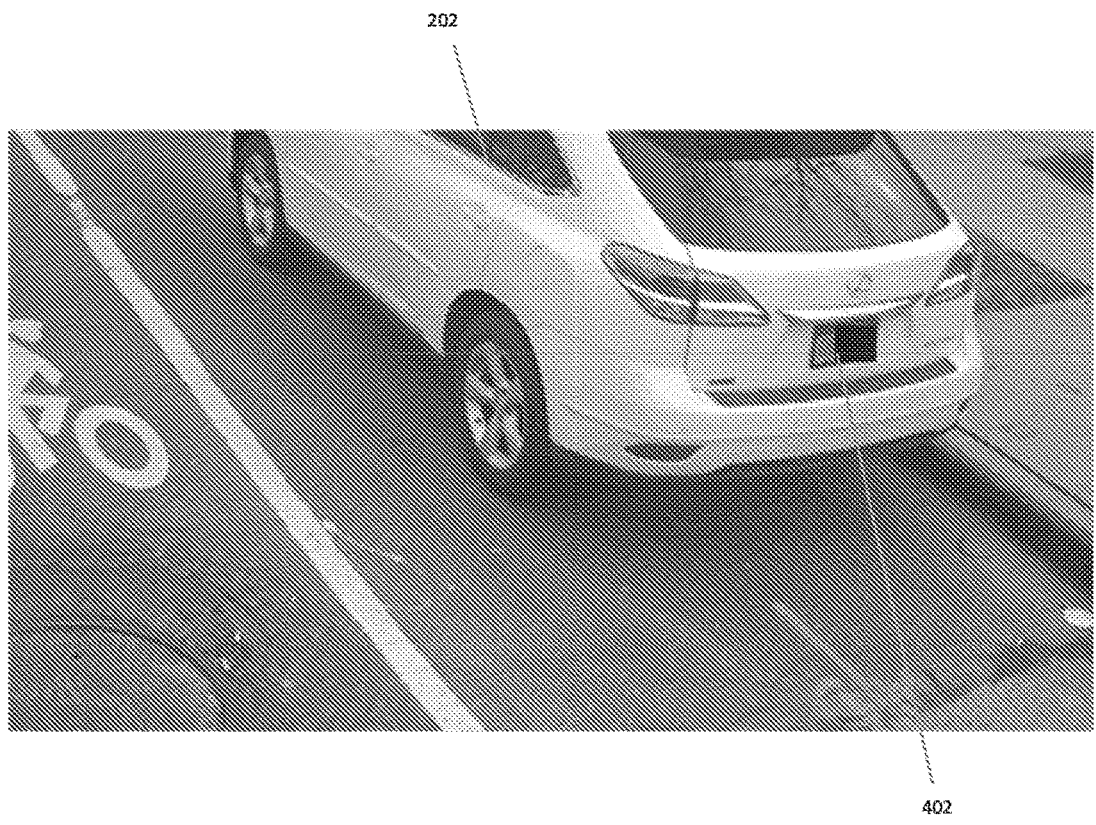
FIG. 4 illustrates one example of point-of-view image data captured by an ALPR camera positioned at a front portion of a system vehicle.

In one aspect, at step 308A, an ALPR processing engine 112 can be programmed to analyze video and image data obtained from the ALPR camera 104, detect license plates for target vehicles 202, and perform license plate recognition, including determining a state or province that issued the plate. Optionally, the ALPR engine 112 can also perform classification to report the color, make, and model of the target vehicle 202, for example, among other potential vehicle attributes. FIG. 4 illustrates one example of point-of-view image data captured by the ALPR camera 104 when positioned at a front portion of the system vehicle 204. This image data shows how the ALPR camera 104 can be configured to focus on a license plate 402 of the target vehicle 202.

Figure 5:
FIG. 5 illustrates one example of point-of-view image data captured by a context camera positioned at a front portion of a system vehicle.

FIG. 5 illustrates one example of point-of-view image data captured by the context camera 106 when positioned at a front portion of the system vehicle 204. In this example, the context camera 106 can be positioned and programmed to provide a wider view in front of the vehicle 204. As explained below, the context camera 106 can be used to detect target vehicles 202 and to detect enforcement areas or restricted zones 502. In one embodiment, image data can be received from the context camera 106 in a context camera image data module 106A of the system 102. Additionally, video and image data obtained from the context camera 106 can be recorded at step 308B as evidence by an enforcement evidence module 114 of the system 102. Recorded evidence can be included as part of an evidence package, for example, in connection with target vehicle 202 infractions, violations, or other enforcement measures determined by the system 102 at step 310.

Figure 6:
FIG. 6 illustrates an example of overhead map image data useful in connection with certain embodiments of the invention.

FIG. 6 illustrates an example of an overhead map image. A geographical data module 116 of the system 102 can be programmed to access map image data from a geographical data storage 118, which stores map definitions of enforcement zones and other landmarks, for example, which can be used by the system 102. These geographical features can include, among others: enforcement zones 602, 604, such as bus lanes or bus stops; curb lines 606, 608 indicating the position of road curbs; and/or crosswalk markers 610, 612 that indicate positions of crosswalks on the map. In certain embodiments, these geographical features can be defined by the geographical data module 116 as polygons with additional metadata and labels, for example, and then stored accordingly in the geographical data storage 118 for access and use by the system 102.

With regard to vehicle localization tools and techniques, at step 308C a vehicle localization module 120 can be programmed to keep track of target vehicle 202 positions for several reasons. If the system vehicle 204 is in an area with enforcement zones, the system 102 can automatically activate at step 302 and perform enforcement as warranted at step 310. However, if the system vehicle 204 is driving in an area without any enforcement zones, or if enforcement restrictions are not in effect, then the system 102 should not be activated to do any processing nor to generate any events. To check whether the system 102 should be active, a GPS module 122 can be activated at step 308D compare current GPS coordinates against a database 110 of the system 102 associated with applicable enforcement areas and enforcement times. When enforcement is in effect, the system 102 can use knowledge of vehicle position and orientation (e.g., driving direction) typically with higher accuracy than can be provided by GPS module 122 alone. Especially in urban "canyons" in cities, uncorrected GPS errors can easily exceed 30 feet or more, for example. The system 102 therefore can be programmed to leverage coordination of multiple data sources, for example, to calculate more accurate vehicle 202, 204 positions.

In certain embodiments, the system 102 can utilize an inertial measurement unit (IMU) module 124 configured to measure acceleration and angular changes of system vehicle 204 movement. IMU data can be combined with GPS data obtained from the GPS module 122, for example, to continuously update and correct both vehicle position and vehicle orientation. Optionally, the system may connect to the vehicle data bus (e.g., a J1939 communication protocol) to monitor vehicle speed and other movement measurements. The system 102 can be programmed to receive J1939 messages from the vehicle 204 by connecting via an interface to one or more J1939 connection points of the vehicle 204. J1939 provides messages with data such as vehicle speed and steering wheel angle, for example. A vehicle localization module 120 may be programmed to perform data fusion in connection with applying Kalman filtering, fuzzy logic, and/or other techniques to combine GPS data updates (e.g., derived from the GPS module 122), inertial sensor updates (e.g., derived from the IMU module 124), and/or J1939 messages processed in a vehicle communication protocol module 128. In this manner, corrections derived from received video or image data based on applying artificial intelligence (AI) models or algorithms 130 of the system 102 can be used to improve the accuracy of estimating the position of different vehicles 202, 204.

Figure 7:
FIG. 7 illustrates an example of a curb position indication generated by executing a curb detection algorithm.
Figure 8:
FIG. 8 illustrates an example of night-time or low light level output generated by a curb detection algorithm.

In other embodiments, one or more curb detection techniques executed by the system 102 at step 308G may involve using an AI model or algorithm 130 that detects the position of a street curb, for example, based at least in part on video or image data obtained from the context camera 106. The position of the street curb as detected by the algorithm can be compared with the expected curb position as obtained by projecting a curb line obtained by the geographical data module 116 from the geographical data storage 118 in response to an estimated system vehicle 204 position. When there is a mismatch between the observed curb position and the projected curb position, the difference can be used to correct GPS data derived from the GPS module 122 for improving accuracy of the vehicle 204 position estimate. FIG. 7 illustrates an example of output for a curb position indication 702 which can be generated by executing the curb detection technique at step 308G. FIG. 8 illustrates an example of night-time or low light level output which can be generated for a curb position indication 802 by the curb detection model.

Figure 9:
FIG. 9 illustrates an example of output which can be generated by a crosswalk detection algorithm.

At step 308H, a crosswalk detection algorithm can be executed which is another type of an AI algorithm 130 that can detect the typical "zebra" patterns of crosswalks, for example. Similar to curb detection described above, the vehicle detection system 102 can compare the crosswalk position observed in collected video or image data with a projected position of a crosswalk stored and retrieved from the geographical data storage 118. FIG. 9 illustrates an example of output 902 which can be generated by the crosswalk detection model.

In various embodiments, orientation or travel direction of the system vehicle 204 can be a useful component of the determination and estimation processes described herein. For example, a combination of GPS module 122 data coupled with IMU module 124 data can be used to determine the orientation of the vehicle 204 of the system vehicle 204.

The vehicle localization module 120 of the vehicle detection system 102 can be programmed to combine various aspects of the inputs described above in association with different frequency of measurements and their relative accuracy and reliability. For example, a typical GPS receiver might report a new position once a second, while curb detection and crosswalk detection algorithms might provide measurements 10-15 times per second. The measurements can be combined in real-time as they are received and processed. However, for enforcement of violations, which collects evidence for future review, the system 102 can process location measurements in batches (e.g., 1 second or longer), for example, to achieve improved accuracy. This module 120 can be programmed to output estimates of vehicle position and orientation that can be used by other modules in the system 102.

With respect to camera-to-camera calibration, during or after installation two cameras (or multiple cameras) can calibrated with respect to each other. This is a process that can be performed manually by selecting matching ground points in both camera views, or automatically by detecting and matching features in the two cameras. The system 102 can be programmed to calculate ground homography transformation, for example, which maps ground points associated with the ALPR camera 104 to ground points associated with the context camera 106, and vice versa.

With regard to camera-to-GPS calibration, another calibration component provides a mapping between GPS coordinates and features and the context camera 106 image data. In one embodiment, by using this calibration, and given an estimate of vehicle GPS position and orientation and a GPS feature from a map (point, line, polygon), the system 102 can project the map feature onto the context camera 106 image. One possible approach for camera-to-GPS calibration is to calculate a homography between ground points selected in a camera image and matching points from a GPS match. This approach is flexible if it is adequately controlled to resist "stretching" and shifted projections in the captured image data. Another approach is to model the intrinsic and extrinsic parameters of the context camera 106. Such parameters include the camera 106 focal length, the mounting height of the camera 106 above the ground (dependent on vehicle 204 type and mounting position on the vehicle 204), as well as pan, tilt, and roll angles of the camera 106 relative to the vehicle.

Figure 10:
FIG. 10 illustrates one example of user interface controls associated with a calibration tool.
Figure 11:
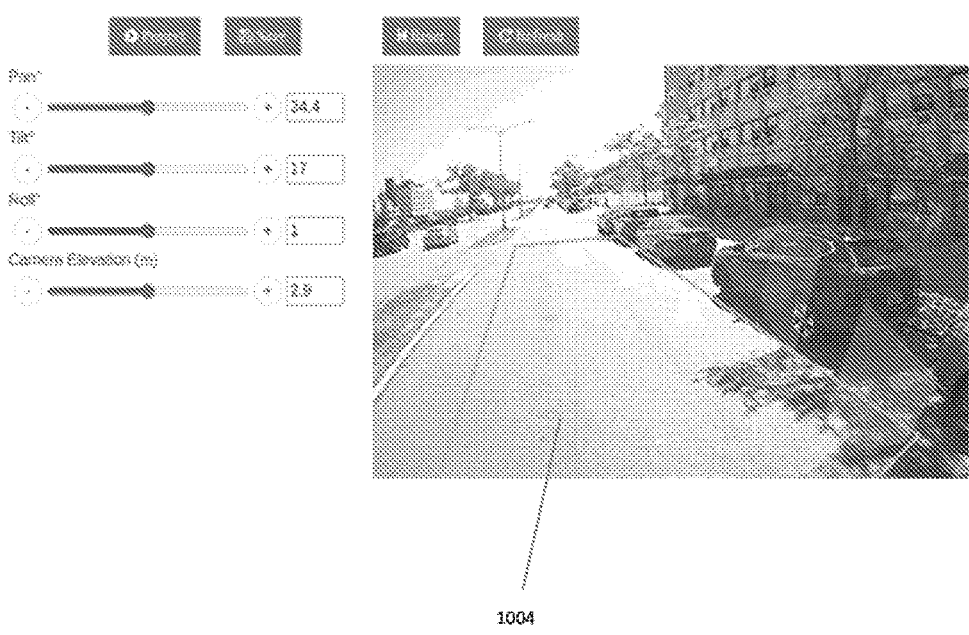
FIG. 11 includes an example of projecting a polygon shown in FIG. 10 onto camera view image data.

FIG. 10 illustrates one example of user interface controls associated with a calibration tool which allows for convenient and ready adjustment of calibration parameters. The user can draw a shape 1004 onto a satellite map image and the calibration tool provides a visualization of how that shape projects into the camera image. Calibration parameter adjustments can be used to adjust the projection to match map features. FIG. 10 depicts an example of the polygon 1004 drawn in the satellite view. FIG. 11 includes an example of projecting the polygon of FIG. 10 onto the camera view.

Figure 12A:
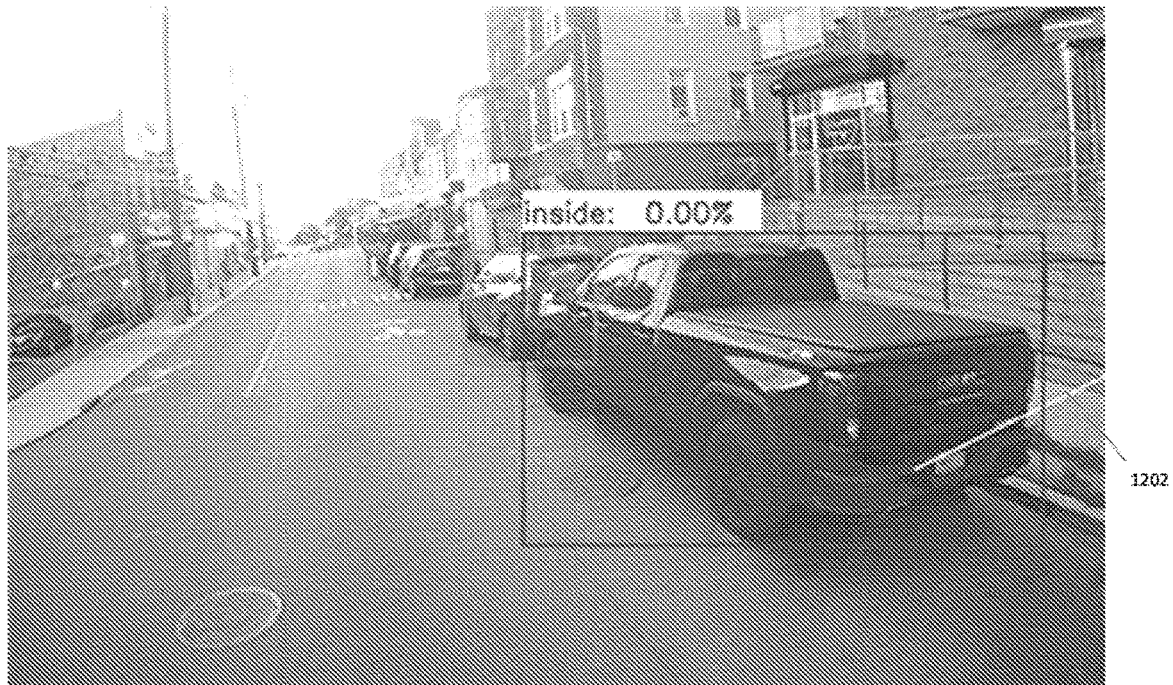
FIG. 12A includes an example of captured image data including an indicator line for a license plate.

With regard to vehicle detection tools and techniques, when the ALPR module 112 detects a vehicle license plate at step 308A after activation of the system 102, multiple steps of analysis can be performed to check for enforcement infractions. Using the camera-to-camera calibration techniques described herein, the system 102 can map license plate coordinates from the ALPR camera 104 image data into the context camera 106 image data. Since the license plate is typically mounted several feet above ground for many target vehicles 202, the projection may not be exact. Geometrically, rather than a single point, a line can be obtained from the context image (e.g., see the white line 1202 in the example of captured image data shown in FIG. 12A). The license plate falls along that line 1202, but its exact position depends on mounting height and distance. An object detection AI model module 132 can be programmed to analyze the context camera 106 image data at step 308I to detect multiple classes of objects, and these classes may be specifically focused on cars, trucks, buses, and other vehicle classes, for example. A bounding module 134 can be programmed to draw a bounding box around each detected object, and to generate a mask that follows the shape of the object and excludes other pixels in the bounding box. A geometric algorithm 130 can be programmed to evaluate the license plate line 1202 against the detected target vehicles 202. The vehicle 202 which most closely matches up with the line 1202 is then used in executing the violation detection module 136 at step 308J. In some cases, no suitable target vehicle 202 is detected in the context camera 106 image data. This may, for example, happen at night in areas with very limited illumination, where vehicles may blend in with a non-illuminated background. As an alternative, the system 102 can still perform violation detection based on the license plate coordinates, as explained herein.

Figure 12B:
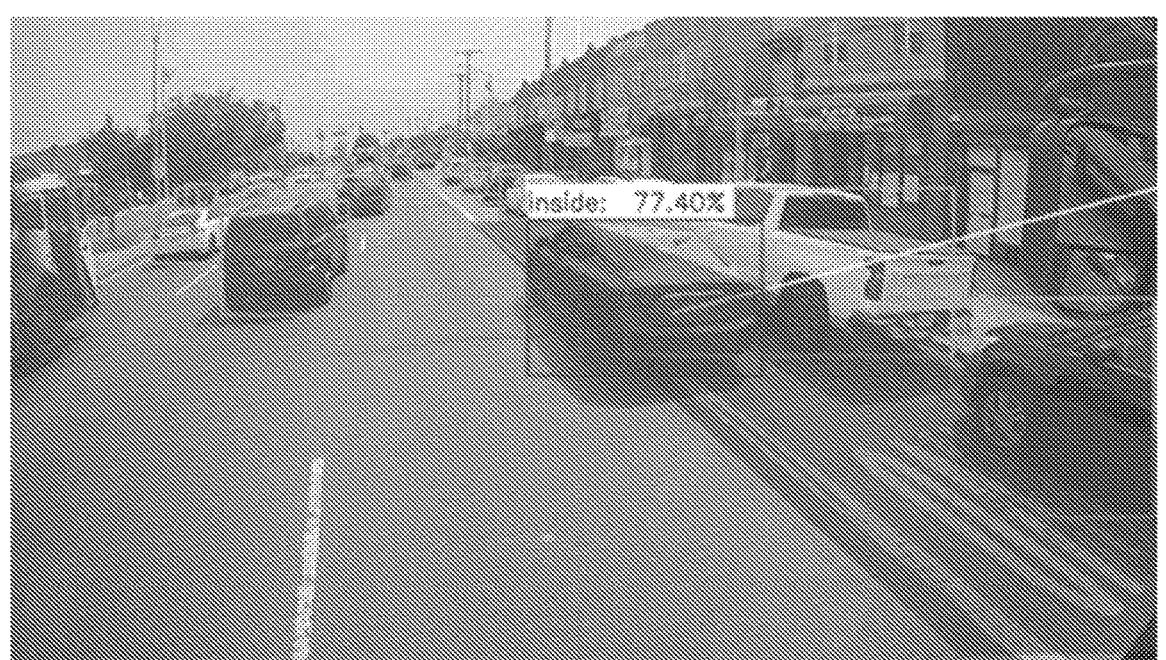
FIGS. 12B and 12C include screens associated with executing a vehicle selection algorithm.
Figure 12C:

FIGS. 12B and 12C illustrate screens associated with a vehicle selection algorithm 130. As the system 102 detects vehicles and license plates in the different cameras 104, 106, at different points in time, each violation can be matched in the image data captured by the context camera 106 to its corresponding license plate shown in the image data captured by the ALPR camera 104. The vehicle selection algorithm analyzes image data of a license plate and determines the bounding box that best matches the license plate based on vehicle type and the proximity of the projection of the license plate to the bounding box. By considering different factors at the same time, the system 102 can avoid selecting an incorrect target vehicle 202 when there are multiple overlapping bounding boxes, for example, or when a license plate is positioned in a higher place on the target vehicle 202.

Figure 13:
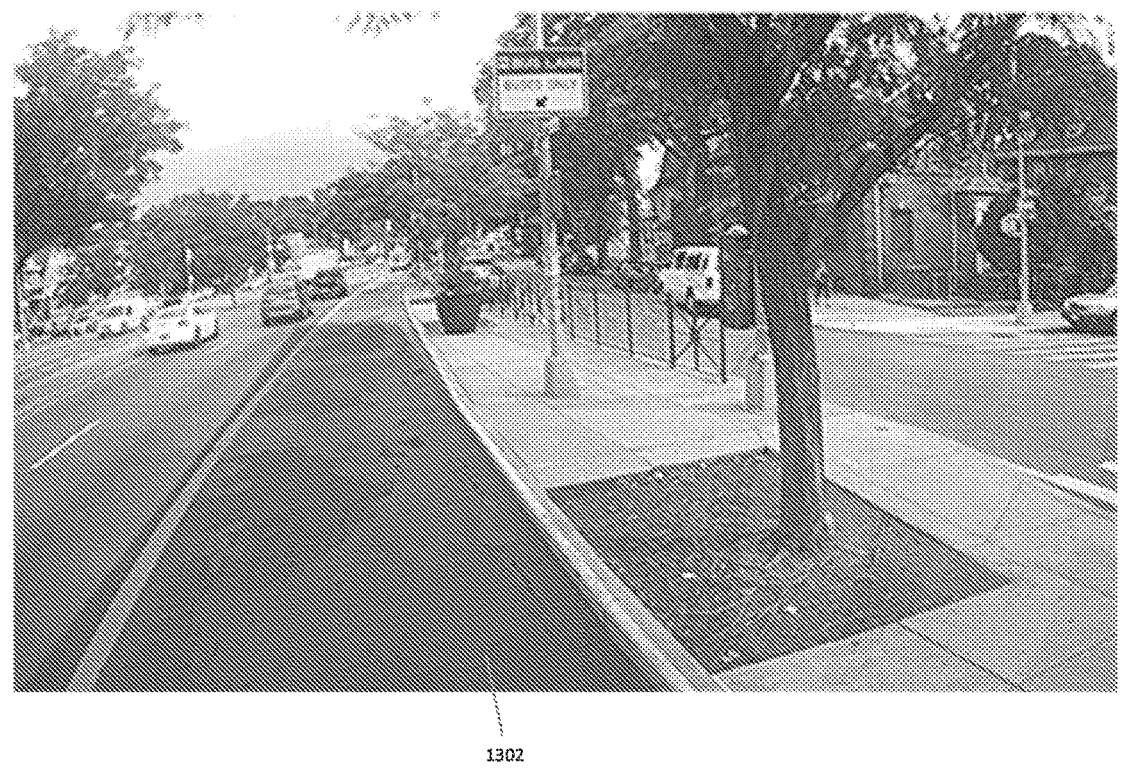
FIG. 13 illustrates an example of overlaying a map feature onto captured image data.
Figure 14:
FIG. 14 includes an example of a bounding box applied to captured image data.
Figure 15:
FIG. 15 illustrates an example of a vehicle mask applied to captured image data.
Figure 16:
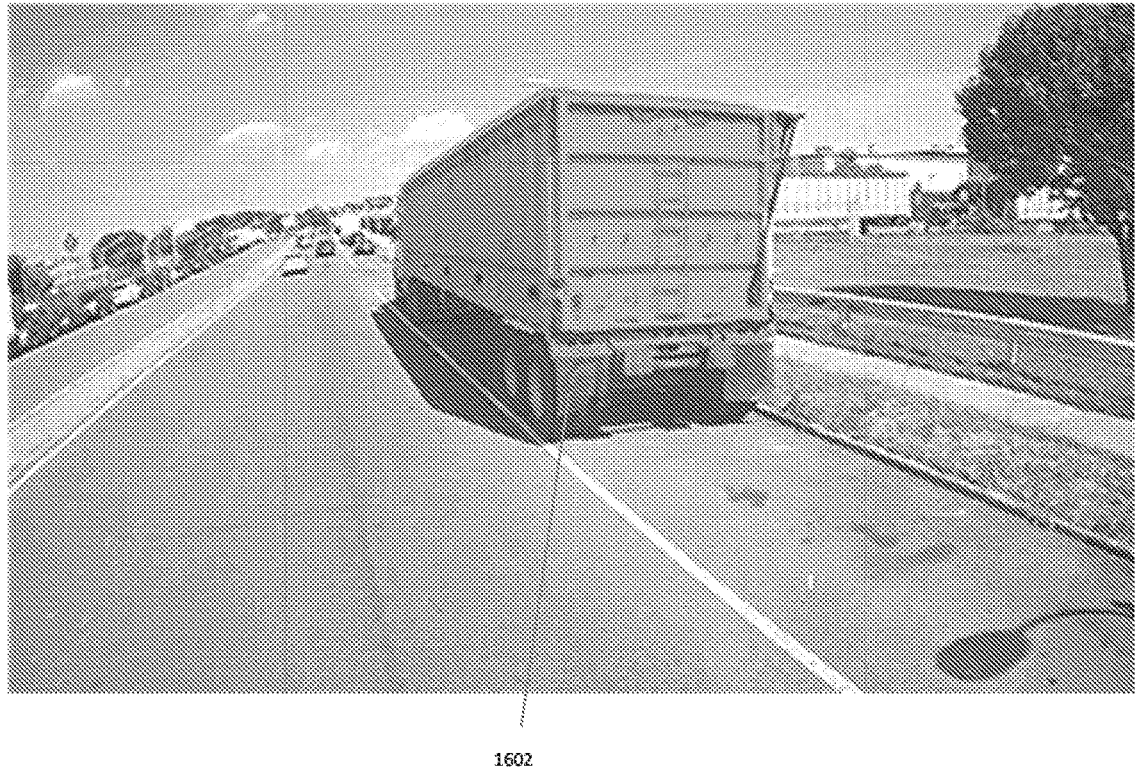
FIG. 16 illustrates another example of a vehicle mask applied to captured image data.

In various embodiments, the violation detection module 136 can be programmed to use and combine data derived from other modules of the vehicle detection system 102 to automatically detect violations at step 308J. A first input can be vehicle position (e.g., corrected GPS coordinates) and vehicle orientation or travel direction. A second input may be obtained from the geographical data module 116. The system can use the camera-to-GPS calibration techniques described herein to project any enforcement zones in the vicinity of the vehicle into the context camera view. FIG. 13 illustrates an example of overlaying a map feature 1302 onto the image. Also, the output of the violation detection module provides the mask of the vehicle associated with the detected license plate, as described below. The system 102 can then check to determine whether the detected vehicle 202 is in an enforcement zone. One approach is to compare the bounding box of the vehicle against the projected zone. However, this approach can suffer from certain drawbacks. For example, depending on relative vehicle positions and observation angles, the bounding box can extend away from the actual vehicle, as shown in the example image of FIG. 14. For example, a vehicle 202 that is legally parked may have a bounding box that extends into an offset bus lane, which could lead to nuisance detections and incorrect violations being reported. A vehicle mask (e.g., such as one generated by the bounding module 134) provides an enhanced input for comparison with enforcement zones, because it does not extend away from the vehicle, as shown in the example of a vehicle mask 1502 included in FIG. 15. Because of three-dimensional geometry, especially for taller vehicles, the full vehicle mask 1602 can extend above the region where the main body or lower portion of the vehicle 202 is located, as shown in the example of FIG. 16. Performing an estimate of where the vehicle 202 is on the ground may assist with this analysis.

Figure 17:
FIG. 17 illustrates an example of a vehicle detected outside of an enforcement zone.
Figure 18:
FIG. 18 includes an example of a detected target vehicle blocking a bus lane.

In certain embodiments, the vehicle detection system 102 can leverage the concept of vanishing points from projective geometry. For example, as the system vehicle 204 drives forward, parallel lane markers appear to converge in a vanishing point in the context of camera image plane (either inside, or possibly outside of, the actual context image). The system 102 may select the lower right corner (e.g., for vehicles 202 on the right) or the lower left corner (e.g., for vehicles 202 on the left). Depending on vehicle 202 position, the system 102 can be programmed to adjust the vertical position of the point—"higher" for vehicles 202 close to the "bottom" of the image, or "lower" for vehicles 202 "higher" in the image. The system 102 can then connect the selected and adjusted point with a straight line to the camera vanishing point, which is readily calculated from camera calibration. The system 102 can then crop the vehicle mask to only include pixels below this connecting line. As a further step, the system 102 can calculate the percentage of the cropped mask that overlaps with the projected enforcement zones in this image. FIG. 17 illustrates an example of a vehicle 202 detected outside of an enforcement zone (e.g., the overlap percentage was calculated as 0%). In contrast, in the example shown in FIG. 18, the vehicle was detected blocking a bus lane (because the overlap percentage was calculated to be 95%). A target vehicle 202 can be considered by the violation detection module 136 to be in an enforcement area, if the calculated percentage exceeds a predetermined threshold, for example.

Figure 19:
FIG. 19 illustrates an example of an output display generated by a lane tracking algorithm.

FIG. 19 illustrates an example of an output display which can be generated by a lane tracking algorithm 130 executed by the system 102 at step 308K. To enhance the precision of estimations and determinations conducted by the system 102, a scene semantic segmentation model module 136 can be implemented to detect street lines and street markings, for example, and other similar features. The system 102 can be programmed to track these features over time and reliably calculate which lane the system vehicle 204 is traversing by which of the lanes correspond to the bus lane, for example, as defined in the geographical data storage 118. In the example shown, four potential lane lines 1902, 1904, 1906, 1908 have been initially identified (with corresponding unique identifiers). By comparison of these features with information contained in the geographical data storage 118, it can be determined that lines 1904, 1906 are most accurately associated with the actual bus lane.

In certain embodiments, to detect whether the target vehicle 202 is stationary, image data derived from the ALPR camera 104, together with calibrations between the cameras 104, 106 and GPS calibration can be used to estimate the position of the target vehicle 202 in map coordinates. By tracking license plates with the ALPR engine 112, the system 102 can determine a relative first position of the detected vehicle 202 to a second position of the vehicle 202 by the license plate indicia as a common identifier. In this manner, the system 102 can determine whether the detected vehicle 202 moved over time or stayed in the same position, for example.

Figure 20:
FIG. 20 illustrates an example of a ground plane projection for a target vehicle.
Figure 23:
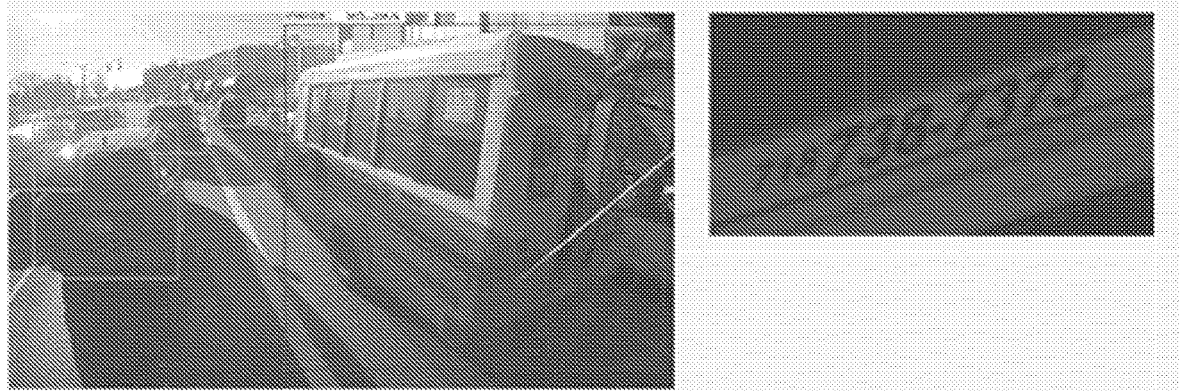

FIG. 20 illustrates an example of a ground plane projection for a target vehicle. To decide whether the vehicle is in the bus lane, for example, the object detection model module 132 can be programmed to detect vehicles on the frame of image data. However, due to environmental conditions (e.g., buildings or structures which block the camera view), sometimes the module 132 cannot detect them. Therefore, this solution involves projecting an estimated position of the vehicle shape onto the ground plane (e.g., using the typical length and width of a mid-size vehicle) based on the license plate's position. Then, the shape can be projected onto image data derived from the context camera 106 to decide whether the vehicle is in the bus lane, for example.

FIG. 21 illustrates an example of filtering output from the ALPR engine 112. In certain cases, the ALPR engine 112 may detect a pattern of numbers and letters which it incorrectly identifies as a license plate, for example. An angle can be calculated between the corners of the detected plate. If the calculated angle is not within a predetermined valid range, then the license plate determination can be discarded.

In certain embodiments, the vehicle detection system may perform evidence collection in real time. For example, evidence collected for potential violations can include the plate number, timestamp, and GPS coordinates associated with a vehicle. Evidence may also include captured image data showing the vehicle license plate, as well as images from the context camera showing that the identified vehicle was indeed inside the enforcement zone. Evidence of detected infractions, including metadata, images, and/or video can be uploaded to a central database of potential violations. However, not all evidence necessarily has to be uploaded immediately (typically over a wireless connection). Instead, certain evidence can be uploaded at a time after its collection later, such as when the enforcement vehicle returns to a depot and connects to Wi-Fi. Additionally, the system can request a download of a video clip for potential violations that match predetermined business rules. This video clip can become part of the evidence packet, together with image snapshots and other metadata, for example.

Depending on traffic rules in each locality, and depending on other customer preferences, the vehicle detection system can be programmed to apply additional business rules to each detected event. For example, it may be a user requirement that the same vehicle be observed multiple times in the same location in an enforcement zone before it can be issued a ticket. In this case, the system can automatically perform matching of violations reported by all the enforcement vehicles to uncover any matches that satisfy all of the applicable business rules. The system may also be programmed with a white list or approved list of exempt license plates, such as license plates of buses, emergency vehicles, and other official or authorized vehicles. The system can be programmed to not generate violations for any vehicles on the white list.

In certain embodiments, the vehicle detection system may be configured for integration or communication with a violation ticketing system 136. Violations that satisfy all user-defined business rules, for example, can be submitted to the ticketing system 136 for further review and for sending out notices of liability to vehicle owners.

In various embodiments, the system 102 can be programmed to communicate with different types of vehicle-based computer systems. Such communications may be vehicle-to-vehicle (V2V), vehicle-to-infrastructure (V2I), or vehicle-to-everything (V2X) communications conducted on a wireless network in which vehicles send messages to each other and/or to other devices or nodes with information about their status and activity. Such data might include speed, location, direction of travel, braking, and loss of stability, among others. For example, the system vehicle 204 may communicate data derived from its stability control system about current road conditions or weather conditions. V2V technology may use dedicated short-range communications (DSRC) in a mesh network, meaning every connected node (e.g., bus, car, smart traffic signal, etc.) might be configured to send, capture and retransmit signals to other nodes within the network.

Various embodiments of the systems, tools and techniques described herein may employ one or more electronic computer networks to promote communication among different components, transfer data, or to share resources and information. Such computer networks can be classified according to the hardware and software technology that is used to interconnect the devices in the network, such as optical fiber, Ethernet, wireless LAN, HomePNA, power line communication or G.hn. Wireless communications described herein may be conducted with Wi-Fi and Bluetooth enabled networks and devices, among other types of suitable wireless communication protocols. For vehicle systems, networks such as CAN or J1939 may be employed, for example. For V2I (vehicle to infrastructure), or V2X (vehicle to everything) communications, technology such as DSRC or 3GPP may be used, for example. The Controller Area Network (CAN) bus is a serial bus protocol which can be used to connect individual systems and sensors as an alternative to conventional multi-wire looms. In certain cases, the CAN bus protocol allows vehicle components to communicate on a single or dual-wire networked data bus. The computer networks may also be embodied as one or more of the following types of networks: local area network (LAN); metropolitan area network (MAN); wide area network (WAN); virtual private network (VPN); storage area network (SAN); or global area network (GAN), among other network varieties.

The examples presented herein can be intended to illustrate potential and specific implementations of the present invention. It can be appreciated that the examples can be intended primarily for purposes of illustration of the invention for those skilled in the art. No particular aspect or aspects of the examples can be necessarily intended to limit the scope of the present invention. For example, no particular aspect or aspects of the examples of system architectures, user interface layouts, or screen displays described herein can be necessarily intended to limit the scope of the invention.

It is to be understood that the figures and descriptions of the present invention have been simplified to illustrate elements that can be relevant for a clear understanding of the present invention, while eliminating, for purposes of clarity, other elements. Those of ordinary skill in the art will recognize, however, that a sufficient understanding of the present invention can be gained by the present disclosure, and therefore, a more detailed description of such elements is not provided herein.

Any element expressed herein as a means for performing a specified function is intended to encompass any way of performing that function including, for example, a combination of elements that performs that function. Furthermore, the invention as may be defined by such means-plus-function claims, resides in the fact that the functionalities provided by the various recited means can be combined and brought together in a manner as defined by the appended claims. Therefore, any means that can provide such functionalities may be considered equivalents to the means shown herein.

In various embodiments, modules or software can be used to practice certain aspects of the invention. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site). In addition, cloud computing techniques may be employed in connection with various embodiments of the invention.

Moreover, the processes associated with the present embodiments may be executed by programmable equipment, such as computers. Software or other sets of instructions that may be employed to cause programmable equipment to execute the processes may be stored in any storage device, such as a computer system (non-volatile) memory. Furthermore, some of the processes may be programmed when the computer system is manufactured or via a computer-readable memory storage medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary. Memory and/or storage components may be implemented using any computer-readable media capable of storing data such as volatile or non-volatile memory, removable or non-removable memory, erasable or non-erasable memory, writeable or re-writeable memory, and so forth.

Examples of computer-readable storage media may include, without limitation, RAM, dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information.

A "computer," "computer system," "computing apparatus," "component," or "computer processor" may be, for example and without limitation, a processor, microcomputer, minicomputer, server, mainframe, laptop, personal data assistant (PDA), wireless e-mail device, smart phone, mobile phone, electronic tablet, cellular phone, pager, processor, fax machine, scanner, or any other programmable device or computer apparatus configured to transmit, process, and/or receive data. Computer systems and computer-based devices disclosed herein may include memory and/or storage components for storing certain software applications used in obtaining, processing, and communicating information. It can be appreciated that such memory may be internal or external with respect to execution of the disclosed embodiments. In various embodiments, a "host," "engine," "loader," "filter," "platform," or "component" may include various computers or computer systems, or may include a reasonable combination of software, firmware, and/or hardware. In certain embodiments, a "module" may include software, firmware, hardware, or any reasonable combination thereof.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers described herein, for example, may be replaced by a "server farm" or other grouping of networked servers (e.g., a group of server blades) that can be located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

In general, it will be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present invention. For example, the embodiments described hereinabove may be implemented in computer software using any suitable computer programming language such as .NET or HTML using, for example, conventional or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high-level languages include Ada, BASIC, C, C++, C#, COBOL, Fortran, Java, Lisp, Pascal, Object Pascal; and examples of scripting languages include Bourne script, JavaScript, Python, Ruby, PHP, and Perl. Various embodiments may be employed in a Lotus Notes environment, for example. Such software may be stored on any type of suitable computer-readable medium or media such as, for example, a magnetic or optical storage medium.

Thus, the execution and behavior of the embodiments can be described without specific reference to the actual software code. The absence of such specific references is feasible because it is clearly understood that artisans of ordinary skill would be able to design software and control hardware to implement the embodiments of the present invention based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network, such as optical fiber, Ethernet, wireless LAN, HomePNA, power line communication or G.hn. The computer networks may also be embodied as one or more of the following types of networks: local area network (LAN); metropolitan area network (MAN); wide area network (WAN); virtual private network (VPN); storage area network (SAN); or global area network (GAN), among other network varieties.

For example, a WAN computer network may cover a broad area by linking communications across metropolitan, regional, or national boundaries. The network may use routers and/or public communication links. One type of data communication network may cover a relatively broad geographic area (e.g., city-to-city or country-to-country) which uses transmission facilities provided by common carriers, such as telephone service providers. In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the access device to the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods and systems described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity. As applied herein, an extranet may include a network or internetwork generally limited to a primary organization or entity, but which also has limited connections to the networks of one or more other trusted organizations or entities (e.g., customers of an entity may be given access an intranet of the entity thereby creating an extranet).

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation. A network bridge can be configured to connect multiple network segments at the data link layer of a computer network while learning which addresses can be reached through which specific ports of the network. In the network, the bridge may associate a port with an address and then send traffic for that address only to that port. In various embodiments, local bridges may be employed to directly connect local area networks (LANs) remote bridges can be used to create a wide area network (WAN) link between LANs; and/or, wireless bridges can be used to connect LANs and/or to connect remote stations to LANs.

In various embodiments, a hub may be employed which contains multiple ports. For example, when a data packet arrives at one port of a hub, the packet can be copied unmodified to all ports of the hub for transmission. A network switch or other devices that forward and filter OSI layer 2 datagrams between ports based on MAC addresses in data packets can also be used. A switch can possess multiple ports, such that most of the network is connected directly to the switch, or another switch that is in turn connected to a switch. The term "switch" can also include routers and bridges, as well as other devices that distribute data traffic by application content (e.g., a Web URL identifier). Switches may operate at one or more OSI model layers, including physical, data link, network, or transport (i.e., end-to-end). A device that operates simultaneously at more than one of these layers can be considered a multilayer switch. In certain embodiments, routers or other like networking devices may be used to forward data packets between networks using headers and forwarding tables to determine an optimum path through which to transmit the packets.

As employed herein, an application server may be a server that hosts an API to expose business logic and business processes for use by other applications. Examples of application servers include J2EE or Java EE 5 application servers including WebSphere Application Server. Other examples include WebSphere Application Server Community Edition (IBM), Sybase Enterprise Application Server (Sybase Inc), WebLogic Server (BEA), JBoss (Red Hat), JRun (Adobe Systems), Apache Geronimo (Apache Software Foundation), Oracle OC4J (Oracle Corporation), Sun Java System Application Server (Sun Microsystems), and SAP Netweaver AS (ABAP/Java). Also, application servers may be provided in accordance with the .NET framework, including the Windows Communication Foundation, .NET Remoting, ADO.NET, and ASP.NET among several other components. For example, a Java Server Page (JSP) is a servlet that executes in a web container which is functionally equivalent to CGI scripts. JSPs can be used to create HTML pages by embedding references to the server logic within the page. The application servers may mainly serve web-based applications, while other servers can perform as session initiation protocol servers, for instance, or work with telephony networks. Specifications for enterprise application integration and service-oriented architecture can be designed to connect many different computer network elements. Such specifications include Business Application Programming Interface, Web Services Interoperability, and Java EE Connector Architecture.

Embodiments of the methods and systems described herein may divide functions between separate CPUs, creating a multiprocessing configuration. For example, multiprocessor and multi-core (multiple CPUs on a single integrated circuit) computer systems with co-processing capabilities may be employed. Also, multitasking may be employed as a computer processing technique to handle simultaneous execution of multiple computer programs.

In various embodiments, the computer systems, data storage media, or modules described herein may be configured and/or programmed to include one or more of the above-described electronic, computer-based elements and components, or computer architecture. In addition, these elements and components may be particularly configured to execute the various rules, algorithms, programs, processes, and method steps described herein.

Various embodiments may be described herein in the general context of computer executable instructions, such as software, program modules, and/or engines being executed by a computer. Generally, software, program modules, and/or engines include any software element arranged to perform particular executions or implement particular abstract data types. Software, program modules, and/or engines can include routines, programs, objects, components, data structures and the like that perform particular tasks or implement particular abstract data types. An implementation of the software, program modules, and/or engines components and techniques may be stored on and/or transmitted across some form of computer-readable media. In this regard, computer-readable media can be any available medium or media useable to store information and accessible by a computing device. Some embodiments also may be practiced in distributed computing environments where executions can be performed by one or more remote processing devices that can be linked through a communications network. In a distributed computing environment, software, program modules, and/or engines may be located in both local and remote computer storage media including memory storage devices.

Although some embodiments may be illustrated and described as comprising functional components, software, engines, and/or modules performing various executions, it can be appreciated that such components or modules may be implemented by one or more hardware components, software components, and/or combination thereof. The functional components, software, engines, and/or modules may be implemented, for example, by logic (e.g., instructions, data, and/or code) to be executed by a logic device (e.g., processor). Such logic may be stored internally or externally to a logic device on one or more types of computer-readable storage media. In other embodiments, the functional components such as software, engines, and/or modules may be implemented by hardware elements that may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Examples of software, engines, and/or modules may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In some cases, various embodiments may be implemented as an article of manufacture. The article of manufacture may include a computer readable storage medium arranged to store logic, instructions and/or data for performing various executions of one or more embodiments. In various embodiments, for example, the article of manufacture may comprise a magnetic disk, optical disk, flash memory or firmware containing computer program instructions suitable for execution by an application specific processor.

Additionally, it is to be appreciated that the embodiments described herein illustrate example implementations, and that the functional elements, logical blocks, modules, and circuits elements may be implemented in various other ways which can be consistent with the described embodiments. Furthermore, the executions performed by such functional elements, logical blocks, modules, and circuits elements may be combined and/or separated for a given implementation and may be performed by a greater number or fewer number of components or modules. As will be apparent to those of skill in the art upon reading the present disclosure, each of the individual embodiments described and illustrated herein has discrete components and features which may be readily separated from or combined with the features of any of the other several aspects without departing from the scope of the present disclosure. Any recited method can be carried out in the order of events recited or in any other order which is logically possible.

Reference to "one embodiment" or "an embodiment" means that a particular feature, structure, or characteristic described in connection with the embodiment is comprised in at least one embodiment. The appearances of the phrase "in one embodiment" or "in one aspect" in the specification can be not necessarily all referring to the same embodiment.

Unless specifically stated otherwise, it may be appreciated that terms such as "processing," "computing," "calculating," "determining," or the like, refer to the action and/or processes of a computer or computing system, or similar electronic computing device, such as a general purpose processor, a DSP, ASIC, FPGA or other programmable logic device, discrete gate or transistor logic, discrete hardware components, or any combination thereof designed to perform the functions described herein that manipulates and/or transforms data represented as physical quantities (e.g., electronic) within registers and/or memories into other data similarly represented as physical quantities within the memories, registers or other such information storage, transmission or display devices.

Certain embodiments may be described using the expression "coupled" and "connected" along with their derivatives. These terms can be not necessarily intended as synonyms for each other. For example, some embodiments may be described using the terms "connected" and/or "coupled" to indicate that two or more elements can be in direct physical or electrical contact with each other. The term "coupled," however, also may mean that two or more elements can be not in direct contact with each other, but still co-operate or interact with each other. With respect to software elements, for example, the term "coupled" may refer to interfaces, message interfaces, application program interface (API), exchanging messages, and so forth.

It will be appreciated that those skilled in the art will be able to devise various arrangements which, although not explicitly described or shown herein, embody the principles of the present disclosure and can be comprised within the scope thereof. Furthermore, all examples and conditional language recited herein can be principally intended to aid the reader in understanding the principles described in the present disclosure and the concepts contributed to furthering the art, and can be to be construed as being without limitation to such specifically recited examples and conditions. Moreover, all statements herein reciting principles, aspects, and embodiments as well as specific examples thereof, can be intended to encompass both structural and functional equivalents thereof. Additionally, it is intended that such equivalents comprise both currently known equivalents and equivalents developed in the future, i.e., any elements developed that perform the same function, regardless of structure. The scope of the present disclosure, therefore, is not intended to be limited to the exemplary aspects and aspects shown and described herein.

Although various systems described herein may be embodied in software or code executed by general purpose hardware as discussed above, as an alternative the same may also be embodied in dedicated hardware or a combination of software, hardware and/or dedicated hardware. If embodied in dedicated hardware, each can be implemented as a circuit or state machine that employs any one of or a combination of a number of technologies. These technologies may include, but can be not limited to, discrete logic circuits having logic gates for implementing various logic functions upon an application of one or more data signals, application specific integrated circuits having appropriate logic gates, or other components, etc. Such technologies can be generally well known by those of ordinary skill in the art and, consequently, may not be described in detail herein.

The flow charts and methods described herein show the functionality and execution of various implementations. If embodied in software, each block, step, or action may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s). Although the flow charts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be omitted or not performed. It is understood that all such variations can be within the scope of the present disclosure.

The terms "a" and "an" and "the" and similar referents used in the context of the present disclosure (especially in the context of the following claims) can be to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as though it were individually recited herein. All methods described herein can be performed in any suitable order unless otherwise indicated herein or otherwise clearly contradicted by context. The use of any and all examples, or exemplary language (e.g., "such as," "in the case," "by way of example") provided herein is intended merely to better illuminate the disclosed embodiments and does not pose a limitation on the scope otherwise claimed. No language in the specification should be construed as indicating any non-claimed element essential to the practice of the claimed subject matter. It is further noted that the claims may be drafted to exclude any optional element. As such, this statement is intended to serve as antecedent basis for use of such exclusive terminology as solely, only and the like in connection with the recitation of claim elements, or use of a negative limitation.

Groupings of alternative elements or embodiments disclosed herein can be not to be construed as limitations. Each group member may be referred to and claimed individually or in any combination with other members of the group or other elements found herein. It is anticipated that one or more members of a group may be comprised in, or deleted from, a group for reasons of convenience and/or patentability.

In various embodiments of the present invention, different types of artificial intelligence tools and techniques can be incorporated and implemented. Search and optimization tools including search algorithms, mathematical optimization, and evolutionary computation methods can be used for intelligently searching through many possible solutions. For example, logical operations can involve searching for a path that leads from premises to conclusions, where each step is the application of an inference rule. Planning algorithms can search through trees of goals and subgoals, attempting to find a path to a target goal, in a process called means-ends analysis.

Heuristics can be used to prioritize choices in favor of those more likely to reach a goal and to do so in a shorter number of steps. In some search methodologies heuristics can also serve to eliminate some choices unlikely to lead to a goal. Heuristics can supply a computer system with a best estimate for the path on which the solution lies. Heuristics can limit the search for solutions into a smaller sample size, thereby increasing overall computer system processing efficiency.

Propositional logic can be used which involves truth functions such as "or" and "not" search terms, and first-order logic can add quantifiers and predicates, and can express facts about objects, their properties, and their relationships with each other. Fuzzy logic assigns a degree of truth (e.g., between 0 and 1) to vague statements which may be too linguistically imprecise to be completely true or false. Default logics, non-monotonic logics and circumscription are forms of logic designed to help with default reasoning and the qualification problem. Several extensions of logic can be used to address specific domains of knowledge, such as description logics, situation calculus, event calculus and fluent calculus (for representing events and time), causal calculus, belief calculus (belief revision); and modal logics. Logic for modeling contradictory or inconsistent statements arising in multi-agent systems can also be used, such as paraconsistent logics.

Probabilistic methods can be applied for uncertain reasoning, such as Bayesian networks, hidden Markov models, Kalman filters, particle filters, decision theory, and utility theory. These tools and techniques help the system execute algorithms with incomplete or uncertain information. Bayesian networks are tools that can be used for various problems: reasoning (using the Bayesian inference algorithm), learning (using the expectation-maximization algorithm), planning (using decision networks), and perception (using dynamic Bayesian networks). Probabilistic algorithms can be used for filtering, prediction, smoothing and finding explanations for streams of data, helping perception systems to analyze processes that occur over time (e.g., hidden Markov models or Kalman filters). Artificial intelligence can use the concept of utility as a measure of how valuable something is to an intelligent agent. Mathematical tools can analyze how an agent can make choices and plan, using decision theory, decision analysis, and information value theory. These tools include models such as Markov decision processes, dynamic decision networks, game theory and mechanism design.

The artificial intelligence techniques applied to embodiments of the invention may leverage classifiers and controllers. Classifiers are functions that use pattern matching to determine a closest match. They can be tuned according to examples known as observations or patterns. In supervised learning, each pattern belongs to a certain predefined class which represents a decision to be made. All of the observations combined with their class labels are known as a data set. When a new observation is received, that observation is classified based on previous experience. A classifier can be trained in various ways; there are many statistical and machine learning approaches. The decision tree is one kind of symbolic machine learning algorithm. The naive Bayes classifier is one kind of classifier useful for its scalability, in particular. Neural networks can also be used for classification. Classifier performance depends in part on the characteristics of the data to be classified, such as the data set size, distribution of samples across classes, dimensionality, and the level of noise. Model-based classifiers perform optimally when the assumed model is an optimized fit for the actual data. Otherwise, if no matching model is available, and if accuracy (rather than speed or scalability) is a primary concern, then discriminative classifiers (e.g., SVM) can be used to enhance accuracy.

A neural network is an interconnected group of nodes which can be used in connection with various embodiments of the invention, such as execution of various methods, processes, or algorithms disclosed herein. Each neuron of the neural network can accept inputs from other neurons, each of which when activated casts a weighted vote for or against whether the first neuron should activate. Learning achieved by the network involves using an algorithm to adjust these weights based on the training data. For example, one algorithm increases the weight between two connected neurons when the activation of one triggers the successful activation of another. Neurons have a continuous spectrum of activation, and neurons can process inputs in a non-linear way rather than weighing straightforward votes. Neural networks can model complex relationships between inputs and outputs or find patterns in data. They can learn continuous functions and even digital logical operations. Neural networks can be viewed as a type of mathematical optimization which performs a gradient descent on a multi-dimensional topology that was created by training the network. Another type of algorithm is a backpropagation algorithm. Other examples of learning techniques for neural networks include Hebbian learning, group method of data handling (GMDH), or competitive learning. The main categories of networks are acyclic or feedforward neural networks (where the signal passes in only one direction), and recurrent neural networks (which allow feedback and short-term memories of previous input events). Examples of feedforward networks include perceptrons, multi-layer perceptrons, and radial basis networks.

Deep learning techniques applied to various embodiments of the invention can use several layers of neurons between the network's inputs and outputs. The multiple layers can progressively extract higher-level features from the raw input. For example, in image processing, lower layers may identify edges, while higher layers may identify the concepts relevant to a human such as digits or letters or faces. Deep learning may involve convolutional neural networks for many or all of its layers. In a convolutional layer, each neuron receives input from only a restricted area of the previous layer called the neuron's receptive field. This can substantially reduce the number of weighted connections between neurons. In a recurrent neural network, the signal will propagate through a layer more than once. A recurrent neural network (RNN) is another example of a deep learning technique which can be trained by gradient descent, for example.

While various embodiments of the invention have been described herein, it should be apparent, however, that various modifications, alterations, and adaptations to those embodiments may occur to persons skilled in the art with the attainment of some or all of the advantages of the present invention. The disclosed embodiments can be therefore intended to include all such modifications, alterations, and adaptations without departing from the scope and spirit of the present invention as described and claimed herein.

What is claimed is:

1. A vehicle analysis system comprising:
an automatic license plate recognition (ALPR) module programmed for receiving image data from at least one ALPR camera in association with a license plate of a target vehicle;
a context camera module programmed for receiving image data from at least one context camera that is distinct from the at least one ALPR camera in association with the target vehicle, the context camera image data depicting an operating environment of the target vehicle;
a geographical data module programmed for accessing map image data from at least one geographical data storage which stores a plurality of map definitions associated with a plurality of restricted zones; and
at least one artificial intelligence model and/or algorithm programmed for:
combining at least a portion of each of the received ALPR camera image data, the received context camera image data, and the geographical data storage map image data,
processing the received context camera image data to identify one or more scene elements associated with the restricted zones,
using at the least portion of the combined data including the identified scene elements for determining a location of the target vehicle in relation to at least one restricted zone, wherein the determining comprises determining whether the target vehicle is present within the at least one restricted zone, and
generating an enforcement determination indicative of a violation when the target vehicle is determined to be present within the at least one restricted zone.

2. The system of claim 1, further comprising:
a global positioning system (GPS) module programmed for processing position data associated with a position of a system vehicle; and
the artificial intelligence model and/or algorithm further programmed for combining at least a portion of the processed position data with the combined ALPR camera image data, the context camera image data, and the geographical data storage map image data.

3. The system of claim 1, further comprising:
an inertial measurement unit (IMU) module programmed for processing movement data and/or acceleration data associated with movement of a system vehicle; and
the artificial intelligence model and/or algorithm further programmed for combining at least a portion of the processed movement data with the combined ALPR camera image data, the context camera image data, and the geographical data storage map image data.

4. The system of claim 1, further comprising a vehicle localization module programmed for tracking at least one position of the target vehicle.

5. The system of claim 1, further comprising a vehicle communication protocol module programmed for connecting to a data bus of a system vehicle.

6. The system of claim 5, further comprising the vehicle communication protocol module programmed for:

receiving at least velocity data associated with the system data; and the artificial intelligence model and/or algorithm further programmed for combining at least a portion of the received velocity data with the combined ALPR camera image data, the context camera image data, and the geographical data storage map image data.

7. The system of claim 5, further comprising the vehicle communication protocol module programmed for receiving J1939 protocol communications from the system vehicle.

8. The system of claim 1, further comprising a curb detection algorithm programmed for detecting a position of a street curb in response to at least video or image data obtained from the context camera.

9. The system of claim 8, further comprising the curb detection algorithm programmed for detecting the position of the street curb in response to:

comparing an expected curb position associated with projecting a curb line obtained from the map image data of the geographical data storage, and an estimated system vehicle position.

10. The system of claim 1, further comprising a crosswalk detection algorithm programmed for detecting a crosswalk pattern in at least a portion of the received image data.

11. The system of claim 10, further comprising the crosswalk detection algorithm programmed for detecting the crosswalk pattern in response to comparing the crosswalk pattern detected in the received image data with a projected position of the crosswalk pattern associated with the map image data of the geographical data storage.

12. The system of claim 1, further comprising a camera-to-camera calibration algorithm programmed for calibrating the ALPR camera and the context camera with respect to each other.

13. The system of claim 1, further comprising a camera-to-GPS calibration algorithm programmed for provides a mapping between:

at least one global positioning system (GPS) map feature and GPS coordinates associated with the map feature, and at least a portion of the image data received from the context camera.

14. The system of claim 1, further comprising:

the ALPR module programmed for detecting at least on vehicle license plate, and an algorithm programmed for mapping plate coordinates of the detected license plate onto at least a portion of the image data received from the context camera.

15. The system of claim 1, further comprising a bounding module programmed to:

draw a bounding box around at least one detected object in the received image data, and to generate a mask corresponding to a shape of the detected object.

16. The system of claim 1, further comprising a violation detection module programmed to automatically detect a violation, the violation detected module programmed for:

analyzing at least a portion of the data combined by the artificial intelligence model and/or algorithm, and projecting image data associated with the restricted zone onto image data displaying the target vehicle.

17. The system of claim 1, further comprising a scene semantic segmentation model module programmed for detecting at least one street feature in the received image data.

18. The system of claim 17, further comprising a lane tracking algorithm programmed for:

tracking the street feature over a predetermined time period, comparing the street feature to at least a portion of the map image data stored in the geographical data storage, and determining which street feature is most accurately associated with the restricted zone.

19. The system of claim 1, further comprising the ALPR module programmed for:

detecting a pattern of numbers and/or letters provisionally identified as a license plate, calculating an angle between different corners of the detected license plate, and when the calculated angle is not within a predetermined valid range, discarding image data associated with the detected license plate.

20. The system of claim 1, further comprising a vehicle selection algorithm programmed for:

analyzing the image data received from the ALPR camera and the image data received from the context camera in association with the target vehicle license plate, matching the target vehicle image data captured by the context camera to a corresponding license plate for the target vehicle shown in the image data captured by the ALPR camera.

21. The system of claim 1, further comprising a vehicle selection algorithm programmed for determining a bounding box that best matches the license plate in response to a vehicle type and/or a proximity of a projection of the license plate image data to the bounding box.

22. The system of claim 1, wherein the restricted zone comprises at least one of a bus lane, a bus stop, a parking area, and/or a bicycle lane.

\* \* \* \* \*